US011186962B2

United States Patent
Van Vessem et al.

(10) Patent No.: US 11,186,962 B2
(45) Date of Patent: Nov. 30, 2021

(54) SYSTEM FOR USE WITH A CRANE ON A SURFACE VESSEL

(71) Applicant: IHC HOLLAND IE B.V., Sliedrecht (NL)

(72) Inventors: Henricus Gerardus Andreas Van Vessem, Vught (NL); Boudewijn Casper Jung, Bergen op Zoom (NL)

(73) Assignee: IHC HOLLAND IE B.V.

( * ) Notice: Subject to any disclaimer, the term of this patent is extended or adjusted under 35 U.S.C. 154(b) by 0 days.

(21) Appl. No.: 16/480,800

(22) PCT Filed: Jan. 31, 2018

(86) PCT No.: PCT/NL2018/050065
§ 371 (c)(1),
(2) Date: Jul. 25, 2019

(87) PCT Pub. No.: WO2018/139931
PCT Pub. Date: Aug. 2, 2018

(65) Prior Publication Data
US 2019/0390432 A1    Dec. 26, 2019

(30) Foreign Application Priority Data
Jan. 30, 2017 (NL) ..................................... 2018257

(51) Int. Cl.
*E02D 7/06* (2006.01)
*B63B 35/00* (2020.01)
(Continued)

(52) U.S. Cl.
CPC .............. *E02D 7/06* (2013.01); *B63B 35/003* (2013.01); *B66C 1/108* (2013.01); *B66C 1/62* (2013.01);
(Continued)

(58) Field of Classification Search
CPC .. B66C 1/42; B66C 1/62; B66C 23/62; B66C 23/185; B63B 27/10; B63B 27/30
(Continued)

(56) References Cited

U.S. PATENT DOCUMENTS 3,600,031 A * 8/1971 Coleman .................. B66C 1/66
294/199
3,666,216 A * 5/1972 Nagy ...................... B63B 21/66
244/137.4
(Continued)

FOREIGN PATENT DOCUMENTS

CN       104234031 B    12/2015
EP        1640508 B1     3/2006
(Continued)

OTHER PUBLICATIONS

International Search Report and Written Opinion for International Application No. PCT/NL2018/050065; dated Jun. 12, 2018.
(Continued)

*Primary Examiner* — Frederick L Lagman
(74) *Attorney, Agent, or Firm* — Mendelsohn Dunleavy, P.C.

(57) ABSTRACT

The invention relates to a system (1) for use with a crane (4) on a surface vessel (3), comprising a crane tool (15) attached or attachable to a hoisting cable (5) of the crane (4) and one or more adaptors (16) attached or attachable to one or more tools (11-14, 25) for carrying out operations or to one or more components (2, 10), the crane tool (15) comprising a connector (17) and at least one of the adaptors (16) comprising a connector-counterpart (18).

19 Claims, 4 Drawing Sheets

(51) Int. Cl.
*B66C 23/18* (2006.01)
*B66C 1/62* (2006.01)
*B66C 1/10* (2006.01)
*E02D 7/14* (2006.01)
*E02D 13/00* (2006.01)
*F03D 13/25* (2016.01)
*B66C 23/52* (2006.01)
*E02B 17/02* (2006.01)
*E02B 17/00* (2006.01)
*F03D 13/20* (2016.01)

(52) U.S. Cl.
CPC .............. *B66C 23/185* (2013.01); *E02D 7/14* (2013.01); *E02D 13/00* (2013.01); *B66C 23/52* (2013.01); *E02B 17/021* (2013.01); *E02B 2017/0056* (2013.01); *E02D 2600/10* (2013.01); *F03D 13/22* (2016.05); *F03D 13/25* (2016.05)

(58) Field of Classification Search
USPC ............... 212/242, 243, 251, 259, 326, 327; 294/82.24, 82.31, 82.32
See application file for complete search history.

(56) References Cited

U.S. PATENT DOCUMENTS

| | | | | |
|---|---|---|---|---|
| 4,360,230 A | * | 11/1982 | Wood | B66C 1/66 294/82.3 |
| 4,518,186 A | * | 5/1985 | Hornberg | B66C 1/66 294/82.24 |
| 6,223,675 B1 | * | 5/2001 | Watt | B63G 8/001 114/312 |
| 6,257,162 B1 | * | 7/2001 | Watt | B63G 8/001 114/244 |
| 6,390,012 B1 | * | 5/2002 | Watt | B63B 27/36 114/322 |
| 6,447,036 B1 | * | 9/2002 | White | B66C 1/427 294/106 |
| 7,648,183 B2 | * | 1/2010 | Cornwell | B66C 1/62 294/90 |
| 9,067,766 B1 | | 6/2015 | Bateman et al. | |
| 2017/0016199 A1 | * | 1/2017 | Elmer | G10K 11/16 |
| 2018/0282967 A1 | * | 10/2018 | Elliott | E02D 7/14 |

FOREIGN PATENT DOCUMENTS

| | | |
|---|---|---|
| EP | 2500473 B1 | 9/2012 |
| EP | 2752361 B1 | 7/2014 |
| EP | 3034860 B1 | 6/2016 |
| GB | 2417233 A | 2/2006 |
| JP | 10279289 A * | 10/1998 |
| WO | WO2008106964 A1 | 9/2008 |

OTHER PUBLICATIONS

Communication pursuant to Article 94(3) EPC for corresponding European application No. 18703864.1; dated Sep. 21, 2020 (8 pages).

* cited by examiner

SYSTEM FOR USE WITH A CRANE ON A SURFACE VESSEL

The invention relates to a system for use with a crane e.g. on a surface vessel, such as a ship or jack-up barge, and to a method of installing an on- or offshore installation, such as a foundation for a wind turbine.

Typical offshore cranes have a set of slings to connect to e.g. hooks on tools (equipment) or components such as piling equipment and foundation parts. For a change of tool or component, the main crane hook has to be lowered to deck level to connect and disconnect the slings, which, moreover, requires at least three staff member to (dis)connect the slings, and costs much time and deck space. After placing or employing a tool or component, the slings are typically put back on deck.

Also, as a result of lowering the crane hook to deck level the hoisting cable and the winch for the cable are subjected to considerable wear, especially when the crane hook is lifted from deck without a load. This occurs e.g. when the slings of a tool, such as a noise mitigation screen or NMS, or component are lifted over a considerable vertical distance until they are taut. The hoist cable is very expensive and time consuming to replace.

It is an object of the present invention to facilitate the hoisting of tools and components during installing of an offshore installation, such as a foundation, e.g. a monopile or jacket, for a wind turbine.

To this end, the present invention provides a system for use with a crane on a surface vessel, comprising a crane tool attached or attachable to a hoisting cable of the crane and one or more, e.g. a plurality of, adaptors attached or attachable to one or more tools, e.g. a plurality of mutually different tools, for carrying out operations, e.g. lifting and manoeuvring equipment, such as a noise mitigation screen and/or a pile driver, and/or to one or more, e.g. a plurality of, components, such as a monopile or a transition piece, of an offshore installation, the crane tool comprising a connector and at least one of the adaptors, e.g. a plurality of the adaptors, comprising a connector-counterpart.

In an embodiment, the connector or the at least one connector-counterpart is a male connector, e.g. a pin or cylindrical block, and the other is a female connector, e.g. a bucket.

The connector and connector-counterpart provided by the present invention require less personnel, costs and/or time to connect, by mating the connector and the connector-counterpart, a hoisting cable to a tool or component, to disconnect the hoisting cable from a tool or component, to connect the hoisting cable to a further tool or component, require less or no hoisting slings, occupy less deck space and/or are safer for personnel on deck. Depending on the configuration, illustrated in an example below, the connection according to the present invention enables reducing travel of the hoisting cable.

Besides, the speed of the operations that can be performed with the system will increase, while the cost of these operations are reduced.

In an embodiment, the at least one connector-counterpart faces upwards and/or is adjustable, e.g. rotatable, towards a position where it faces upwards.

Thus, the direction of connection of the connecter and connector-counterpart can be aligned and the connector of the crane tool can be dropped in or over the connector-counterpart of the adaptor, facilitating connecting the hoisting cable to a tool or a component.

To further facilitate establishing a connection, in particular by dropping in or over, in an embodiment, the connector and/or the at least one connector-counterpart is rotationally symmetrical.

Thus, the rotational orientation of the crane tool and the tool or component is no longer critical or at least less critical than with the traditional hook and slings.

In a straightforward embodiment of this concept, the connector or the at least one connector-counterpart comprises one or more latches, preferably radially movable elements, such as wedges or spheres, which are resiliently mounted and/or operatively coupled to an actuator, and the other comprises a notch or a rim, e.g. a circumferential flange, for the latch or latches to hook in or behind.

In another embodiment, one or more of the adaptors comprises, in addition to the connector-counterpart, a transition element, such as a spreader bar or connecting rods, to couple the connector-counterpart to the tool or component.

In another embodiment, the connector and/or connector-counterpart comprises guiding elements, such as a conical portion, e.g. a stabbing cone, on one part and a circular opening or funnel on the other part.

In a further embodiment, the crane tool comprises measuring equipment, preferably a global positioning system (GPS), an imaging device, e.g. a camera and video image processing unit, and/or an inclination sensor, e.g. to measure verticality of the crane tool and optionally of the tool or component connected to the crane tool.

Such sensors can be employed e.g. to measure or show on a screen the position of the crane tool relative to the adaptor and assist the crane operator in establishing a connection. Also, vessels and operations nowadays are being digitalized. Although operators know the position of the crane (rotation, height of the boom tip, length of the hoisting cable), they cannot know the exact position of the end of the hoisting cable. When the crane tool comprises measuring equipment, such as GPS, the position of the crane tool is known, making digitalization of the operation more precise. If the XYZ coordinates of the crane tool and of the counterparts on the tools and/or components are known, automation of at least part of the operations, in addition to the docking, is facilitated. This can improve operational efficiency and deck layout. Further, such sensors can be employed e.g. to ensure that not only the crane tool and a counterpart, such as a bucket, on a tool and/or component are aligned, but also that the hoisting cable and boom tip are vertically aligned. Such vertical alignment helps in reducing or avoiding a swinging effect when the tool or component is lifted.

The sensors can also be used during operation of the working tool, for example during positioning or driving a pile. Also, the crane tool and the connected tool can be configured in such a way that they can communicate with each other. For instance, when the crane tool and a hammer adaptor provided with a calendaring system are connected, information about the calendaring could be communicated to the crane tool, which can then store this information locally or transmit it to a receiver in a control system.

In an embodiment, the system comprises a pile driver and an adaptor attached to the pile driver, wherein the adaptor comprises a sliding element indicative of displacement, preferably in the direction of pile driving, i.e. typically in the vertical direction, of the pile driver relative to the crane tool.

The sliding element can provide information about displacement e.g. in terms of the distance that the pile has moved at any stage. E.g., it can be employed to measure the distance (penetration) per hammer blow in order to compare the effect of individual blows and also to enable proper operation of the system.

In a refinement, the adaptor comprises a (first) cylindrical element, e.g. a bucket, fixed or configured to be fixed relative to the pile driver and a further cylindrical element, e.g. a further bucket, slidingly fitted in or over the (first) bucket and preferably fixed relative to the crane tool. Thus, the crane tool can be maintained at a constant position (height) by means the hoisting cable and/or, if the tool is provided with a GPS, the exact position of the crane tool measured and displacement of the sliding element, e.g. of the (first) bucket relative to the further bucket, can be observed or measured accurately, providing an effective calendar measuring system. This system can even be configured to measure pile penetration per blow of the pile driver and thus e.g. calculate the energy required for the next blow and/or establish sooner than with conventional calendar system when the pile has reached the stage referred to as "refusal", i.e. when pile driving is completed.

To facilitate visually monitoring of the progress of pile driving, the outer wall of the further bucket is provided with one or more markings, e.g. a coloured and/or illuminated ring that is gradually exposed with increasing penetration of the pile and resulting lowering of the pile driver and the first (outer) bucket.

In another embodiment, the system comprises a pile driver and an adaptor attached to the pile driver, wherein the adaptor comprises a sliding element allowing dampened displacement, preferably in the direction of pile driving, i.e. typically in the vertical direction, of the pile driver relative to the crane tool.

In a refinement, the adaptor comprises a cylindrical element fixed relative to the pile driver and a further cylindrical element slidingly fitted in or over the (first) cylindrical element and preferably fixed or configured to be fixed relative to the crane tool.

In a further refinement, the adaptor comprises a (first) cylindrical element, e.g. a bucket, fixed relative to the pile driver and a further cylindrical element, e.g. a further bucket, slidingly fitted in or over the (first) bucket and preferably fixed or configured to be fixed relative to the crane tool. The buckets are coupled via one or more elements for generating friction. In a refinement, one or both buckets are provided with flanges or seals defining a chamber, which chamber is filled with a fluid, e.g. hydraulic oil. Flow resistance can be generated e.g. by a obstruction, such as a flange attached to one of the buckets and moving within the chamber, or by a flow restriction, such as a choking valve at an outlet of the chamber.

Thus, in case of freefall of the pile and pile driver, e.g. when the tip of the pile reaches a ground layer providing low resistance, acceleration of the pile and driver is reduced, in turn reducing the sudden load on the crane and providing some time for the crane operator to respond.

It is noted that these sliding elements can be used independent of the connector and connector-counterpart, e.g. between a pile driver and a conventional hook or shackle, providing the same advantages. In addition, the sliding elements to some extent decouple the crane tool and instruments in it from vibrations in the pile driver.

Further, in a refinement, explained in more detail below, the sliding element for the calendar and the sliding element providing freefall protection are combined, e.g. in a telescopic configuration comprising three buckets.

The invention also relates to a method of installing an installation, e.g. an offshore installation, such as a wind turbine, using a crane, e.g. on the ground or on a surface vessel, and having a hoisting cable, a crane tool attached to the hoisting cable and having a connector, and one or more, e.g. a plurality of, tools and/or components having a connector-counterpart, the method comprising the steps of lowering the crane tool with its connector into or onto a connector-counterpart of one of the tools or components and establishing a connection between the two, lifting the tool or component with the hoisting cable.

In an embodiment, the crane tool is subsequently, e.g. after positioning the tool or component, disconnected from the tool or component and then lowered with its connector into or onto a connector-counterpart of a further, e.g. another and different, tool or component, and a connection is established between the two. The further tool or component is then lifted with the hoisting cable.

In another embodiment, the connection is established above ground level or deck level, preferably at least 5 meters above ground or deck level, thus requiring less paying out and taking in of the hoisting cable.

Another embodiment comprises the steps of connecting a tool, e.g. transition piece lifting tool to a component, e.g. to a transition piece, hoisting the tool and component, positioning the component in or on the offshore installation, removing the tool from the component, moving the tool to a similar or identical component on the deck of the vessel, connecting the tool to or placing the tool on that component, and, disconnecting the crane tool from the connector-counterpart on the tool.

Thus, the overall number of steps is reduced.

For the sake of completeness, attention is drawn to the following prior art.

EP 2 500 473 relates to a method involving "lowering a component (1) which is in form of tubular hollow structure, from floating position with horizontally oriented longitudinal axis, so that reduction takes place down to sea floor (3) or up to defined position. The component is held by manipulation device (8) in vertical position."

EP 1 640 508 relates to a device having "a frame (1) fastened on a ship-jack-up rig for encompassing and guiding a post (5), when ramming the post in a benthic division. A nozzle assembly (7) of a blowing device, which can be lowered from an upper standby position underneath the frame into an operating position at the benthic division, is attached at the frame."

WO2008/106964 relates to a releasable coupling between a heavy object and a locking arrangement and to a method of engaging and disengaging a heavy object and the use of one or more couplings in a pile driver, crusher, demolition hammer, stone or aggregate crusher. With this invention "it may be possible to achieve around 7 strokes per minute or more with the heavy object."

EP 3 034 860 relates to an assembly comprising a tool with a stem having a first end having a projecting portion such as a ring, and a second end adapted to be engaged by a lifting equipment. In the example, "When the hub 500 of the wind turbine has been lifted, the crane is disengaged from the through bore 145 of the second end 140 of the stem 120 and the tool 110 is removed by the operator from the hub 500. Once the tool 110 has been removed, the stem receiving portion 150 may be properly sealed or covered preventing water, dirt, objects, etc. from entering the stem receiving portion 150."

EP 2 752 361 relates to a hoisting system comprising a hoisting crane having a hoisting cable, a craft, and a connector catch assembly for interconnecting the hoisting crane and the craft or a load/cargo on the craft.

GB 2 417 233 relates to an apparatus for automatically coupling and uncoupling an overhead lifting device to a load, which apparatus comprises a first part for connection to the overhead lifting device, and a second part for connection to the load.

The invention will now be explained in more detail with reference to the Figures, which show a preferred embodiment of the present method and system.

The Figures are schematic in nature and details that are not necessary for understanding the present invention may have been omitted and/or have not been discussed.

Figure 1:
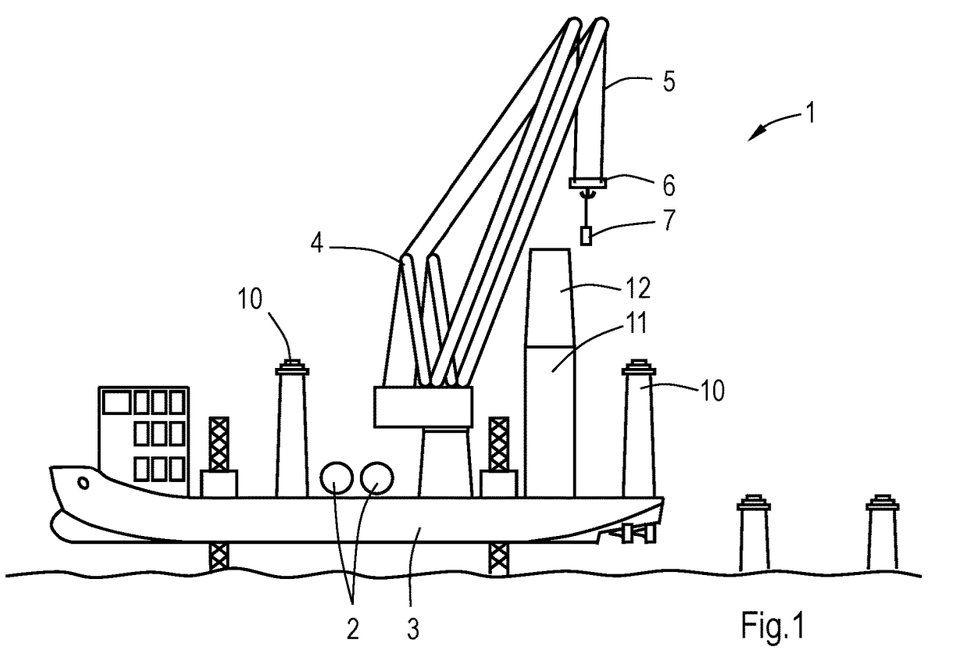
FIG. 1 shows a jack-up barge, comprising a crane and a hoisting cable, for installing a monopile.

FIG. 1 shows an embodiment of a system 1 for installing a monopile 2 in an underwater ground formation, e.g. a seabed. The system 1 comprises a jack-up barge 3 comprising a crane 4 having a hoisting cable 5, and a winch below deck (and thus not shown) for paying out and taking in the cable. The hoisting cable 5 is attached to a spreader bar 6 carrying hooks 7 via forerunners. The barge 3 carries a number of monopiles 2 (MP), positioned horizontally on deck, transition pieces 10 (TP), positioned upright on deck, a noise mitigation screen 11 (NMS), positioned upright on the deck of the barge and at its top provided with a rail frame 12, shown in more detail in FIG. 4, to facilitates handling and accurate positioning of the NMS, a pile upending tool 13 (UET; FIG. 5), a transition piece lifting tool 14 (TPLT; FIG. 6) for moving the TP, and a hydraulic pile driver, e.g. an IHC Hydrohammer S-1800.

Figure 2:
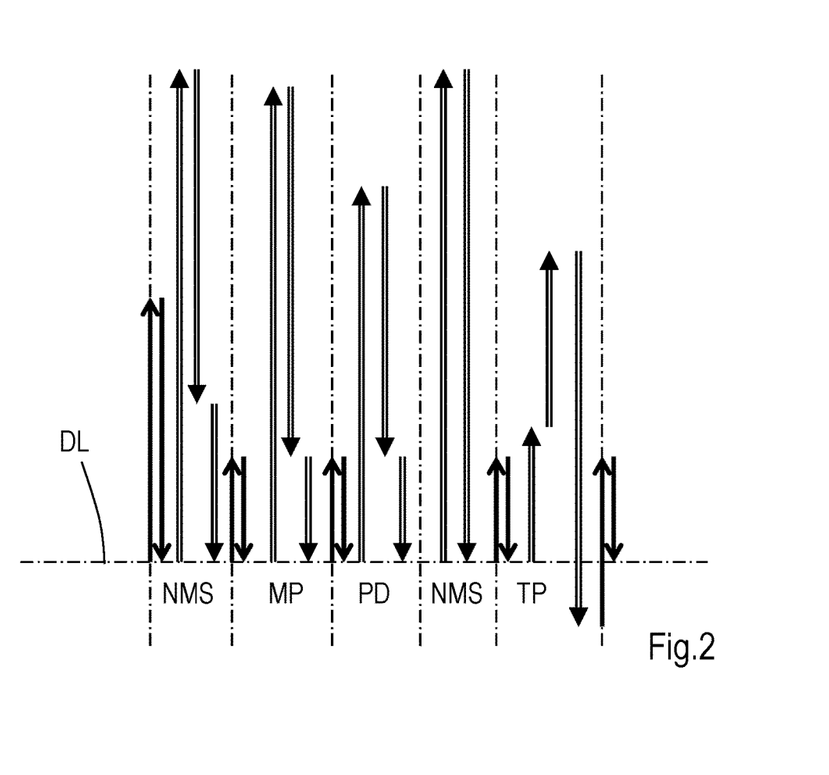
FIG. 2 illustrates the travel of the hoisting cable required during a conventional procedure for installing a monopile and transfer piece.

FIG. 2 illustrates an example of installing a monopile (MP) and transition piece (TP) of a wind turbine. This example involves the following steps: lowering the hook at the end of the hoisting cable of the crane to deck level (DL) to pick up slings from deck and start lifting a noise mitigation screen (NMS). Positioning the NMS on the seabed and putting the slings back on deck. Next, the hook is connected to the pile upending tool (UET), which is then coupled to the monopile, to erect, manoeuvre and place the MP inside the NMS. Subsequent steps include: picking up slings and placing the hammer. Placing back the hammer and NMS. Collecting a transition piece lifting tool (TPLT) for moving the TP. All or most of these steps involve returning the end of the hoisting cable to deck level and require personnel on deck to attach and detach the hooks and slings.

In accordance with the present invention, instead of a hook, a crane tool 15 is attached to the hoisting cable 5 of the crane 4. Further, an adaptor 16 is attached to each of the tools, in the example above an adaptor is attached to each of the following: the rail frame 12, the pile upending tool (UET), the transition piece lifting tool (TPLT), and the hydraulic pile driver.

The crane tool comprises a connector 17 and the adaptor comprises a connector-counterpart 18. In example shown in FIGS. 3A to 3F, the cable tool 15 comprises an attachment eye 19 for the hoisting cable of the crane, a circle cylindrical main body 20 comprising a plurality of latches 21 evenly distributed over the circumference of the main body, thus rendering it rotationally symmetrical, and at its lower end (seen when suspended from the hoisting cable) a stabbing cone 22. The latches are pivotal about axes extending horizontally and tangentially through their lower ends, enabling the latches to deflect inwards when the crane tool is inserted in an adaptor. Hydraulic actuators (hidden from view) are located inside the main body to actively retract the latches, e.g. to release the crane tool from an adaptor.

The adaptor 16 in FIGS. 3A to 3F is attached to the hydraulic pile driver 25 via a transition cylinder 26 that clears the lifting eye of the driver, without significant changes to the driver. Attached to the cylinder is a first bucket 27, fixed relative to the pile driver. A second bucket 28 is slidingly fitted inside the first bucket. A third bucket 29 is slidingly fitted in the second bucket. Each of the three buckets has an outwardly extending flange at it lower rim and an inwardly extending flange at it top rim, providing a telescoping arrangement. The outwardly extending flange on the first bucket serves to attach, e.g. bolt, the telescoping arrangement to the transition cylinder. The inwardly extending flange 35 on the third bucket defines an insertion opening for the receiving the crane and provides a rim for the latches to lock behind. The remaining flanges define first and second chambers between the buckets, which are filled with a hydraulic oil. The second chamber (between the second or middle and third or inner buckets) is provides with one or more choking valves. The outer wall of the second (and middle) bucket is provided with one or more markings, in this example a coloured ring 36 (best seen in FIGS. 3C and 3F) having a height of e.g. 30 cm.

The skill person will appreciate that the second bucket can be employed as (part of) a calendar measuring system, a blow measuring device, and/or a positioning device.

Figures 3A, 3B:
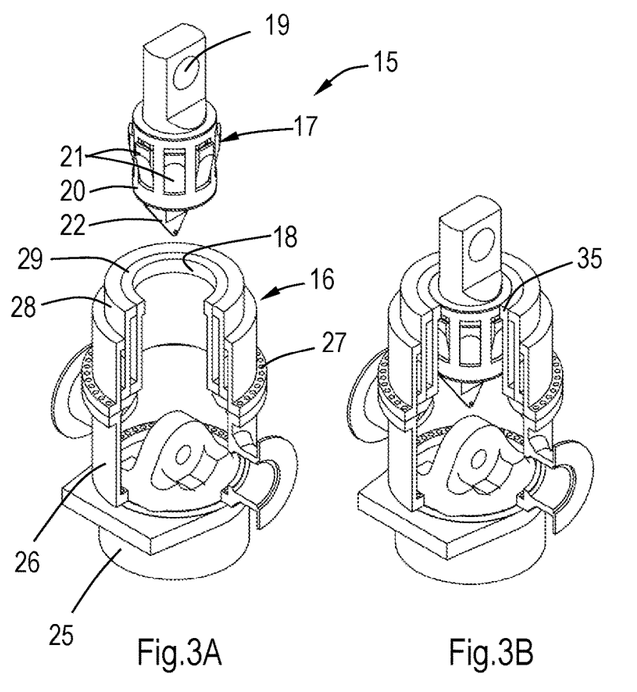
FIGS. 3A to 3F show a crane tool and a pile driver adapting piece according to the present invention.
Figure 3C:
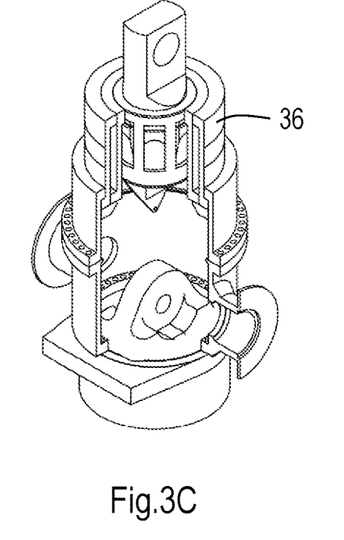

In FIG. 3A, the pile driver 25 is in sea-fastened position on the deck of the barge 3. The crane tool 15 is being lowered into the third (and innermost) bucket 29, during which the stabbing cone 22 passively centers the crane tool relative to the adaptor 16, and the latches are deflected inwards by the inward extending flange 35 on the bucket, to establish a connection between the crane tool and the adaptor and thus between the crane and the pile driver. When or after the position shown in FIG. 3B has been reached the operator locks the crane tool inside the adaptor by remote control for safe lifting. The choking valves in the second chamber are closed, locking the hydraulic oil inside the chamber and thus locking the third (inner) bucket relative to the second (middle) bucket. When the pile driver is lifted, as shown in FIG. 3C, the third and second buckets are pulled out from the first (outer) bucket until the second bucket reaches end of travel. At end of travel, fluid pressure will build up in the second chamber and the pile driver is lifted.

Figure 3D:
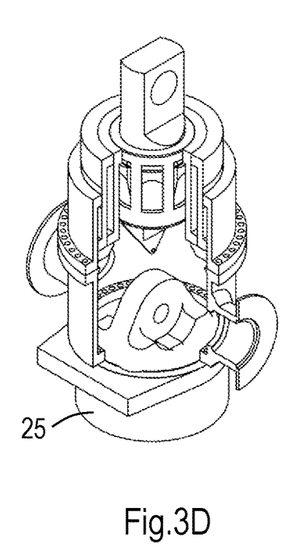
Figure 3E:
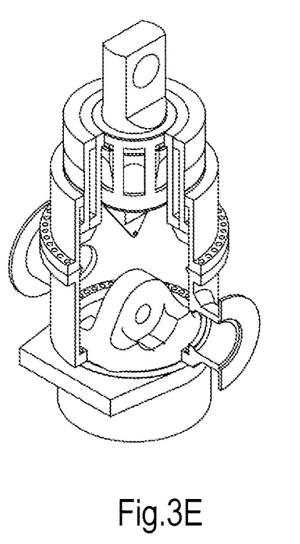

In FIG. 3D, the pile driver has been placed on the monopile and the choking valves are opened, enabling dampened sliding of the third (inner) bucket inside the second (middle) bucket. The crane tool is lowered further, thus lowering the second bucket into the first (outer) bucket until the marking on the second bucket in no longer visible. Pile driving is started, causing the pile, the pile driver and thus the first (and outer) bucket to lower with each blow of the pile driver relative to the crane tool, gradually exposing the coloured ring 36. When the ring is entirely exposed, as shown FIG. 3E, the crane tool is lowered by means of the crane until the ring is no longer visible.

Figure 3F:
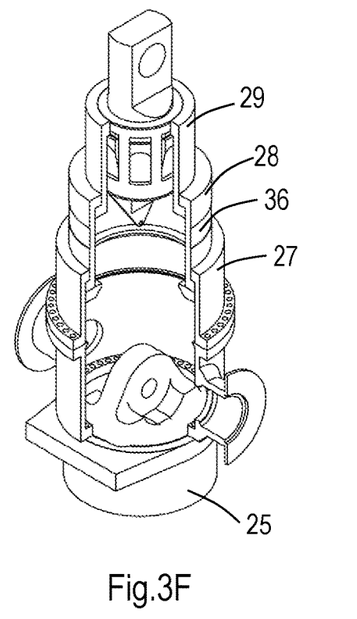
Figure 4A:
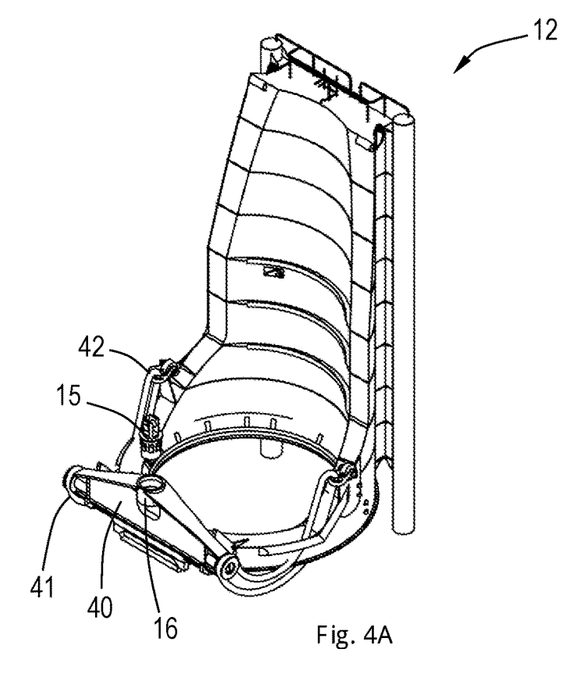
FIGS. 4A-4D show a crane tool and an adaptor according to the present invention connected to a rail frame of a noise mitigation screen.
Figure 4B:
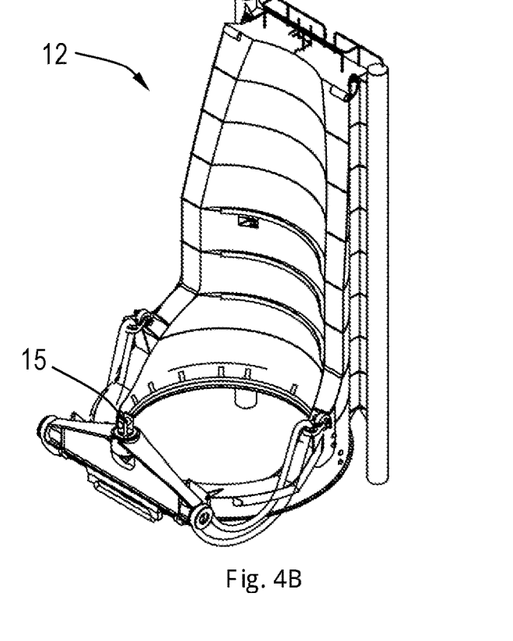
Figure 4C:
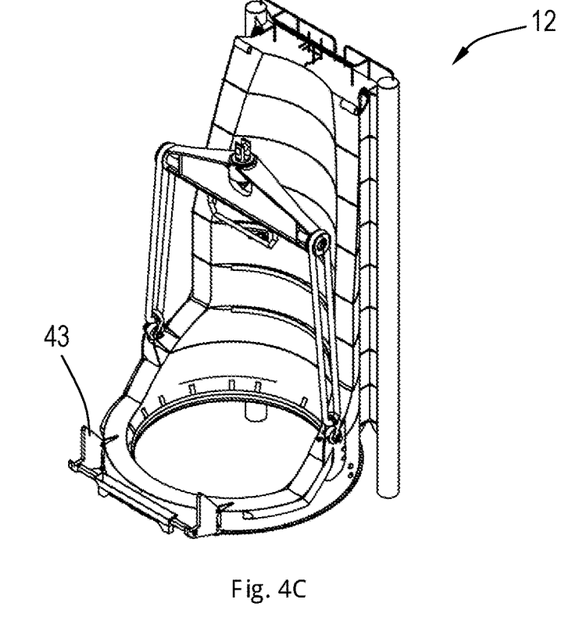
Figure 4D:
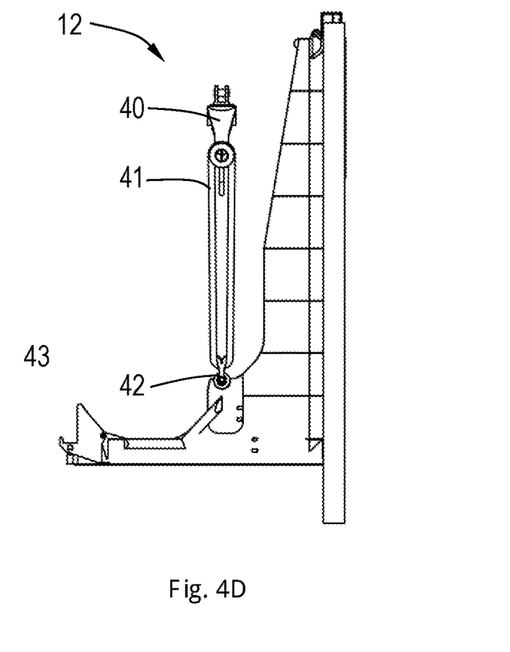
Figure 5A:
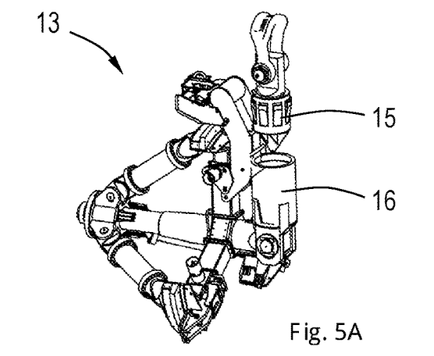
FIGS. 5A-5D and 6A-6B show a crane tool and an adaptor according to the present invention connected to a pile upending tool and a transition piece lifting tool.
Figure 5B:
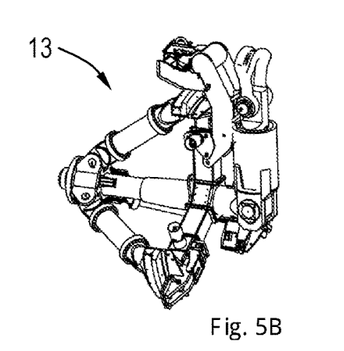
Figure 5C:
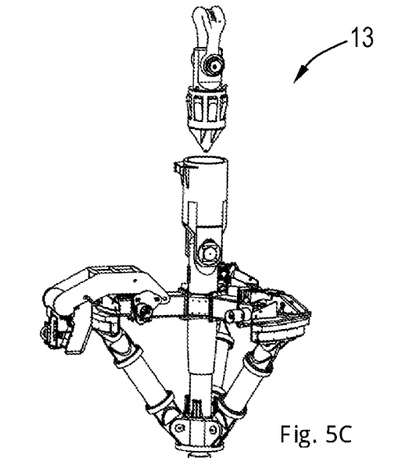
Figure 5D:
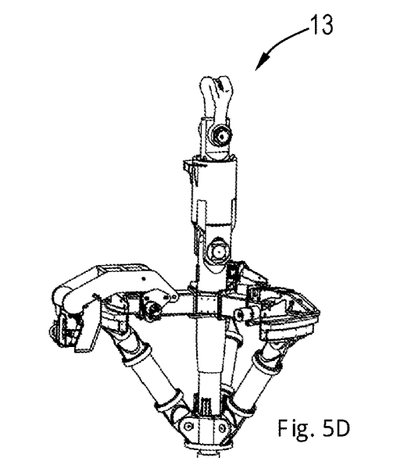

FIG. 3F illustrates what happens in the monopile and the pile driver are freefalling, e.g. when the tip of the pile reaches a ground layer providing low resistance: the first (outer) bucket slides relative to the second (middle) bucket until end of travel and the second bucket subsequently slides relative to the third (inner) bucket squeezing the hydraulic oil from the second chamber through the throttling/choking valves. This dampens the falling movement. The fluid oil is stored in a tank or accumulator (not shown).

FIGS. 4A-4D show a crane tool 15 and an adaptor 16 connected to a rail frame 12 of a noise mitigation screen. The adaptor is attached to the rail frame 12 via a spreader bar 40, slings 41 and shackles 42, which in turn are connected to existing lifting eyes on the rail frame. The spreader is sea-fastened in a dedicated support 43 attached to the rail frame and with the adaptor facing upwards, to enable the crane tool to be dropped in.

Figure 6A:
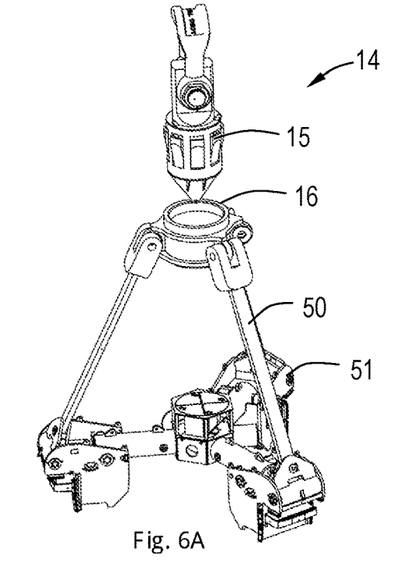
Figure 6B:
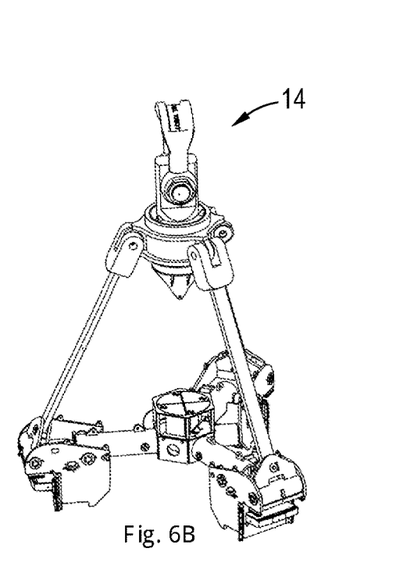

FIGS. 5A-5D and 6A-6B show a crane tool 15 and an adaptor 16 connected to a pile upending tool 13 (FIG. 5) and a transition piece lifting tool 14 (FIG. 6).

Since the monopiles are positioned horizontally on deck, the monopiles, after the pile upending tool 13 shown in FIGS. 5A-5D has been inserted in and secured to one end of the monopile, will, when hoisted, rotate to a vertical position. Accordingly, the adaptor 16 is rotatable relative to the rest of the pile upending tool 13, again to enable the crane tool 15 to be dropped into the adaptor 16.

In FIGS. 6A-6B, the adaptor 16 is attached to the transition piece lifting tool 14 via rods 50, one to each of the clamps 51 of the lifting tool thus positioning the adaptor above the center of gravity of the lifting tool and with its insertion opening facing upwards.

The crane tool and adaptor require less personnel and time to connect a hoisting cable to a tool or component, require less or no hoisting slings, occupy less deck space and/or are safer for personnel on deck. The illustrated example enables reducing total travel of the hoisting cable during installation of a wind turbine by more than 50%. Also, because less slings and shackles are required and travel of the tool and other parts is reduced, the so-called swinging effect is reduced as well.

The invention is not restricted to the embodiment described above and can be varied in numerous ways within the scope of the claims. E.g., the method and system according to the present invention are also suitable to install smaller installations, such as jacket piles.

The invention claimed is:

1. A system for use with a crane comprising:
a crane tool attached or attachable to a hoisting cable of the crane and
one or more adaptors attached or attachable to one or more tools for carrying out operations and/or to one or more components, the crane tool comprising
a circle cylindrical main body, and
a connector, and
at least one of the adaptors comprising a connector-counterpart, wherein connector comprises a plurality of latches evenly distributed over a circumference of the main body and the connector-counterpart comprises a notch or a rim configured for the latches to hook in or behind, the latches are pivotable about axes extending horizontally and tangentially through their lower ends located around the circumference of the main body, enabling the latches to deflect inwards when the crane tool is inserted in one of the adaptors, and hydraulic actuators are located inside the main body to actively retract the latches by rotation about their axes to release the crane tool from the at least one adaptor.

2. The system according to claim 1, wherein the connector or the at least one connector-counterpart is a male connector and the other of the connector or the at least one connector-counterpart is a female connector.

3. The system according to claim 1, wherein the at least one connector-counterpart faces upwards and/or is adjustable towards a position where the at least one connector-counterpart faces upwards.

4. The system according to claim 1, wherein the connector or the at least one connector-counterpart is rotationally symmetrical, or the connector and the at least one connector-counterpart are both rotationally symmetrical.

5. The system according to claim 1, wherein one or more of the adaptors comprises a transition element to couple the connector-counterpart to the tool or component.

6. The system according to claim 1, wherein the connector, or the connector-counterpart, comprises guiding elements, or the connector and the connector-counterpart both comprise guiding elements.

7. The system according to claim 1, wherein the crane tool comprises measuring equipment.

8. The system according to claim 7, wherein the measuring equipment is one or more of a global position system, an imaging device and an inclination sensor.

9. The system according to claim 1, comprising a pile driver and one said adaptor is attached to the pile driver, wherein the adaptor comprises a sliding element indicative of displacement of the pile driver relative to the crane tool.

10. The system according to claim 9, wherein the sliding element is provided with at least one marking that is gradually exposed with increasing penetration of a pile and a resulting lowering of the pile driver.

11. The system according to claim 9, wherein the adaptor attached to the pile driver comprises a first cylindrical element fixed relative to the pile driver and a second cylindrical element slidingly fitted in or over the cylindrical element.

12. The system according to claim 11, wherein the second cylindrical element is also fixed or configured to be fixed relative to the crane tool.

13. The system according to claim 1, comprising a pile driver and one said adaptor is attached to the pile driver, and wherein the adaptor attached to the pile driver comprises a sliding element allowing dampened displacement of the pile driver relative to the crane tool.

14. The system according to claim 13, wherein the adaptor attached to the pile driver comprises a first cylindrical element fixed relative to the pile driver and a second cylindrical element slidingly fitted in or over the cylindrical element.

15. A method of installing an installation using a crane having a hoisting cable, a crane tool attached to the hoisting cable and having a circle cylindrical main body and a connector, and one or more tools, one or more components or one or more tools and components having a connector-counterpart, wherein the connector comprises a plurality of latches and the connector-counterpart comprises a notch or a rim configured for the latches to book in or behind, the latches are pivotable about axes extending horizontally or tangentially through their lower ends located around a circumference of the cylindrical main body, enabling the latches to deflect inwards when the crane tool is inserted into or onto the connector-counterpart, and hydraulic actuators are located inside the main body to actively retract the latches by rotation about their axes to release the crane from the connector-counterpart, the method comprising steps of:

lowering the crane tool with its connector into or onto one said connector-counterpart of one of the one or more tools or one or more components and establishing a connection between the crane tool and the tool or the component,     lifting the tool or component with the hoisting cable.

16. The method according to claim 15, wherein the connection is established above ground level or deck level.

17. The method according to claim 16, wherein connection is established at least 5 meters above the ground or the deck level.

18. The method according to claim 15, comprising steps of:

connecting one said tool to one said component, hoisting the connected tool and component, positioning the component in or on the installation, removing the tool from the component, moving the removed tool to another said similar or identical component on ground or on a deck of a vessel,     connecting the moved tool to or placing the moved tool on that another said similar or identical component, and,     disconnecting the crane tool from the connector-counterpart on the tool connected to the another said similar or identical component.

19. The method according to claim 15, wherein the installation is a wind turbine.

\* \* \* \* \*